United States Patent
Kabawala (10) Patent No.: US 8,810,584 B2
(45) Date of Patent: Aug. 19, 2014

(54) SMART POWER MANAGEMENT IN GRAPHICS PROCESSING UNIT (GPU) BASED CLUSTER COMPUTING DURING PREDICTABLY OCCURRING IDLE TIME

(75) Inventor: Bhavesh Narendra Kabawala, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 514 days.

(21) Appl. No.: 13/230,857

(22) Filed: Sep. 13, 2011

(65) Prior Publication Data

US 2013/0063450 A1    Mar. 14, 2013

(51) Int. Cl.
G06F 15/16 (2006.01)
G06T 1/20 (2006.01)
G06F 1/32 (2006.01)
G06F 9/50 (2006.01)

(52) U.S. Cl.
CPC ........... *G06T 1/20* (2013.01); *G06F 1/3287* (2013.01); *G06F 9/505* (2013.01); *G06F 9/5044* (2013.01)
USPC .......................................................... 345/502

(58) Field of Classification Search
CPC ......... G06T 1/20; G06F 1/3287; G06F 9/505; G06F 9/5044
USPC .......................................................... 345/502
See application file for complete search history.

(56) References Cited

U.S. PATENT DOCUMENTS

| | | | |
|---|---|---|---|
| 7,321,974 B2 | 1/2008 | Anderson et al. | |
| 7,586,493 B1 * | 9/2009 | Sams | 345/502 |
| 7,634,668 B2 | 12/2009 | White et al. | |
| 7,653,825 B1 | 1/2010 | White et al. | |
| 7,721,118 B1 * | 5/2010 | Tamasi et al. | 713/300 |
| 7,779,191 B2 | 8/2010 | Lu et al. | |
| 8,041,976 B2 | 10/2011 | Kern et al. | |
| 8,103,884 B2 | 1/2012 | Brey et al. | |
| 8,364,999 B1 | 1/2013 | Adessa | |
| 2004/0039954 A1 * | 2/2004 | White et al. | 713/322 |
| 2004/0249775 A1 * | 12/2004 | Chen | 706/21 |
| 2006/0149985 A1 * | 7/2006 | Dubinsky | 713/324 |
| 2007/0067136 A1 * | 3/2007 | Conroy et al. | 702/130 |
| 2008/0018652 A1 * | 1/2008 | Toelle et al. | 345/506 |
| 2008/0098242 A1 * | 4/2008 | Peterson | 713/320 |
| 2009/0027403 A1 * | 1/2009 | Jung | 345/505 |
| 2011/0055596 A1 * | 3/2011 | Wyatt | 713/300 |
| 2011/0060932 A1 * | 3/2011 | Conroy et al. | 713/340 |
| 2012/0249559 A1 | 10/2012 | Khodorkovsky et al. | |
| 2012/0278800 A1 * | 11/2012 | Nicholas et al. | 718/1 |

* cited by examiner

*Primary Examiner* — David T Welch (74) *Attorney, Agent, or Firm* — Zilka-Kotab, PC (57) ABSTRACT

A method includes automatically acquiring, through a resource manager module associated with a driver program executing on a node of a cluster computing system, information associated with utilization of a number of Graphics Processing Units (GPUs associated) with the node, and automatically calculating a window of time in which the node is predictably underutilized on a reoccurring and periodic basis. The method also includes automatically switching off, when one or more GPUs is in an idle state during the window of time, power to the one or more GPUs to transition the one or more GPUs into a quiescent state of zero power utilization thereof. Further, the method includes maintaining the one or more GPUs in the quiescent state until a processing requirement of the node necessitates utilization thereof at a rate higher than a predicted utilization rate of the node during the window of time.

20 Claims, 5 Drawing Sheets

SMART POWER MANAGEMENT IN GRAPHICS PROCESSING UNIT (GPU) BASED CLUSTER COMPUTING DURING PREDICTABLY OCCURRING IDLE TIME

FIELD OF TECHNOLOGY

This disclosure relates generally to Graphics Processing Unit (GPU) based cluster computing systems and, more particularly, to a method, an apparatus and/or a system of smart power management in GPU based cluster computing during predictably occurring idle time.

BACKGROUND

Utility of a GPU based cluster may extend beyond a supercomputing system to an enterprise customer (e.g., a bank, an automotive company, a pharmaceutical company). The enterprise customer may utilize expensive real estate to set up a computing system that requires an expensive cooling system. When the computing system includes several GPU clusters, a number of the GPU clusters may not be utilized following a decrease in the load on the computing system (e.g., outside working hours of a bank). However, as the idle GPU clusters also have power consumption associated therewith, the enterprise customer may still have to bear cost(s) associated with the aforementioned power consumption. Moreover, the continuous power consumption associated with the GPU clusters may decrease lifetime(s) of the constituent GPUs.

SUMMARY

Disclosed are a method, an apparatus and/or a system of smart power management in Graphics Processing Unit (GPU) based cluster computing during predictably occurring idle time.

In one aspect, a method includes automatically acquiring, through a resource manager module associated with a driver program executing on a node of a cluster computing system, information associated with utilization of a number of GPUs associated with the node. The number of GPUs is configured to perform substantial processing associated with the node. The method also includes automatically calculating a window of time in which the node is predictably underutilized on a reoccurring and periodic basis, and automatically switching off, when one or more GPUs of the number of GPUs is in an idle state during the window of time in which the node is predictably underutilized on the reoccurring and periodic basis, power to the one or more GPUs to transition the one or more GPUs from the idle state to a quiescent state of zero power utilization thereof through the resource manager module associated with the driver program.

Further, the method includes maintaining the one or more GPUs in the quiescent state of zero power utilization thereof until a processing requirement of the node necessitates utilization of the one or more GPUs at a rate higher than a predicted utilization rate of the node during the window of time.

In another aspect, a method includes automatically calculating a window of time in which a node of a cluster computing system is predictably underutilized on a reoccurring and periodic basis. The node includes a number of GPUs configured to perform a substantial portion of processing associated therewith. The method also includes maintaining one or more GPUs associated with the node of the cluster computing system in a state of zero power utilization thereof based on a non-requirement of processing therethrough by switching off power to the one or more GPUs through a resource manager module associated with a driver program executing on the node during the window of time in which the node is predictably underutilized.

Further, the method includes providing, through the resource manager module, an automatic capability to simultaneously transition the one or more GPUs into an active state by powering on the one or more GPUs when a processing requirement therethrough arises and transition another one or more GPUs in an active state into the state of zero power utilization by switching off power thereto when a processing requirement through the another one or more GPUs is dispensed with based on a changing utilization rate of the node when compared to a predicted utilization rate thereof during the window of time.

In yet another aspect, a cluster computing system includes a number of nodes. Each node includes a central processor, a system memory having an operating system and a driver program associated therewith and a number of GPUs configured to perform a substantial portion of processing associated with the each node. The driver program has a resource manager module associated therewith configured to execute on the central processor. The resource manager module is configured to acquire information associated with utilization of the number of GPUs, switch off, when one or more GPUs of the number of GPUs is in an idle state, power to the one or more GPUs to transition the one or more GPUs from the idle state to a quiescent state of zero power utilization thereof during a window of time in which the each node is predictably underutilized on a periodic and reoccurring basis, and maintain the one or more GPUs in the quiescent state of zero power utilization thereof until a processing requirement of the node necessitates utilization of the one or more GPUs at a rate higher than a predicted utilization rate of the each node during the window of time.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system and/or an apparatus of smart power management in Graphics Processing Unit (GPU) based cluster computing during predictably occurring idle time. Although the present embodiments have been described with reference to specific example embodiments, it will be evident that various modifications and changes may be made to these embodiments without departing from the broader spirit and scope of the various embodiments.

Figure 1:
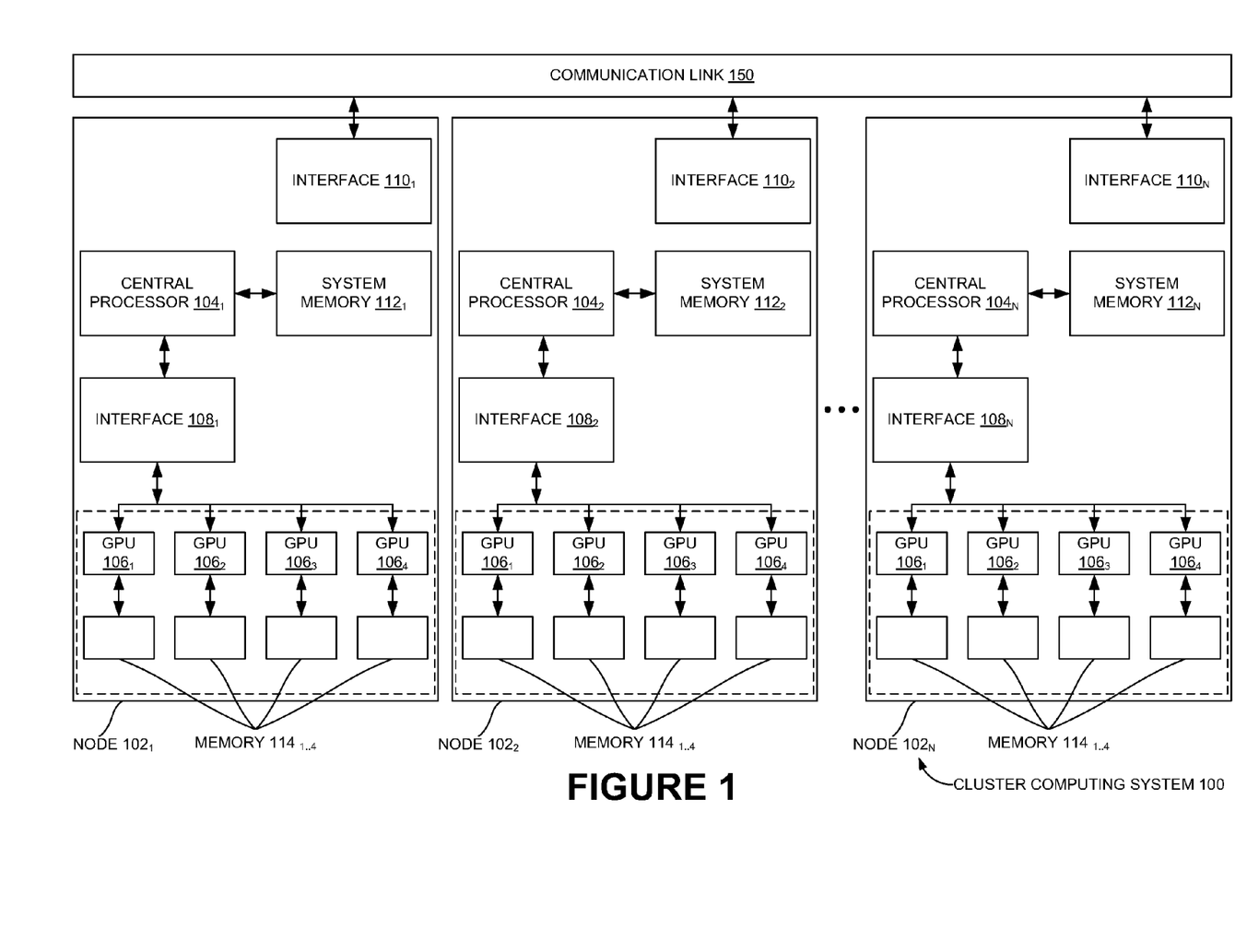
FIG. 1 is a schematic view of a Graphics Processing Unit (GPU) based cluster computing system, according to one or more embodiments.

FIG. 1 shows a GPU based cluster computing system 100, according to one or more embodiments. In one or more embodiments, cluster computing system 100 may include a number of nodes $102_{1-N}$, each of which has a central processor $104_{1-N}$ (e.g., Central Processing Unit (CPU)) associated therewith. In one or more embodiments, each of nodes $102_{1-N}$ may also have more than one central processor associated therewith. In one or more embodiments, each node $102_{1-N}$ may also have a number of GPUs (e.g., GPUs $106_{1\ldots4}$) configured to perform a substantial portion of data processing (e.g., computing) associated therewith. Although FIG. 1 shows four GPUs per node as an example, it is obvious that the number of GPUs per node may be more than four or less than four (e.g., a mere plurality).

In one or more embodiments, each node $102_{1-N}$ may have an appropriate interface (e.g., interface $108_{1-N}$) configured to enable communication between GPUs $106_{1\ldots4}$ and the appropriate central processor $104_{1-N}$. For example, interface $108_{1-N}$ may be a Peripheral Component Interconnect Express (PCIe) x16 slot. In one or more embodiments, each node $102_{1-N}$ may also have an appropriate interface (e.g., interface $110_{1-N}$) in to enable coupling thereof to the communication link (e.g., communication link 150) involved in the computing/processing associated with cluster computing system 100. For example, interface $110_{1-N}$ may be a slot for coupling an appropriate adapter associated with a serial communication link.

In one or more embodiments, central processor $104_{1-N}$ may have system memory $112_{1-N}$ associated therewith. In one or more embodiments, system memory $112_{1-N}$ may be configured to store (e.g., temporarily) instructions executable on central processor $104_{1-N}$. Discussion associated with system memory $112_{1-N}$ is deferred until FIG. 2. In one or more embodiments, again, GPUs $106_{1\ldots4}$ may have memory/memories $114_{1\ldots4}$ (e.g., Dynamic Random Access Memory (DRAM)) associated therewith to store data associated with processing/computation therethrough. In one or more embodiments, GPUs $106_{1\ldots4}$ may be "on board" as part of the "host" including central processor $104_{1-N}$, or, available externally (e.g., as part of a graphics card).

In one or more embodiments, cluster computing system 100 may be available to enterprise customers (e.g., banks, pharmaceutical companies, automotive companies). In the case of enterprise customers, utilization of expensive real estate to set up server systems may be required. In addition, expenses associated with requirements such as cooling systems for huge server farms may be high. In an example scenario of cluster computing system 100 being available to a bank, at least a substantial portion of the GPU resources associated with cluster computing system 100 may be idle following the end of a work day as there is no requirement of executing computing-intensive tasks.

When one or more of GPUs $106_{1\ldots4}$ of each node $102_{1-N}$ of cluster computing system 100 is idle, the power utilization associated therewith is not 0 watts. Thus, an enterprise customer may be paying for power usage associated with the one or more GPUs $106_{1\ldots4}$ of each node $102_{1-N}$ being in an "idle" state (but not in a state of zero power utilization). Considering a large number of clusters associated with the enterprise customer, costs associated with power usage of "idle" GPUs may be very high.

Considering a super computing system with an example 170 "idle" GPU clusters, 4 GPUs per cluster and a power utilization of 45 watts (W) per hour per GPU in the "idle" state, the total power utilization associated with the "idle" clusters in a hour is 30.6 kWh. Thus, an enterprise customer may have to pay for the aforementioned power utilization, despite the GPUs being "idle."

Figure 2:
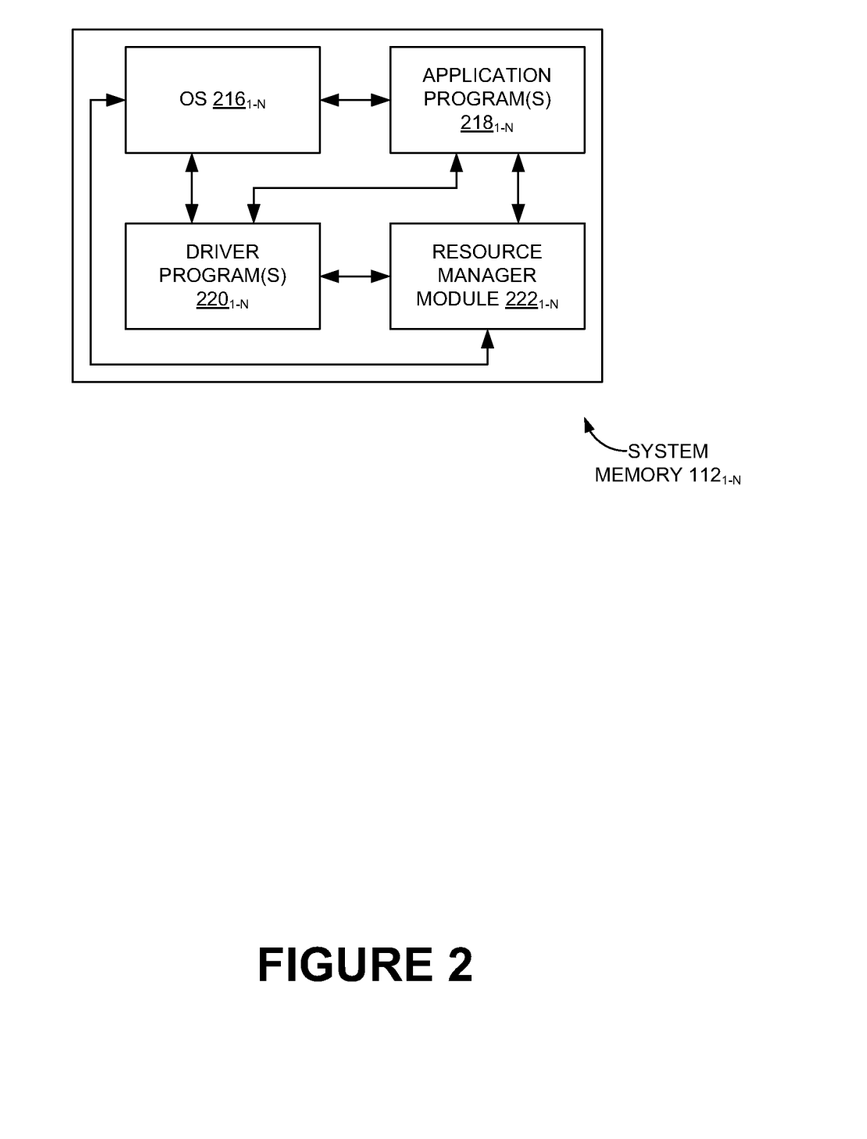
FIG. 2 is a schematic view of a system memory of FIG. 1, according to one or more embodiments.

FIG. 2 shows system memory $112_{1-N}$, according to one or more embodiments. In one or more embodiments, system memory $112_{1-N}$ may include operating system (OS) $216_{1-N}$ loaded therein (e.g., through a bootstrap loader) and application program(s) $218_{1-N}$ (or, application(s) $218_{1-N}$). It is obvious that OS $216_{1-N}$ serves as an intermediary between application program(s) $218_{1-N}$ and the hardware associated with node $102_{1-N}$. Further, it is obvious that instructions associated with OS $216_{1-N}$ and/or application program(s) $218_{1-N}$ may be available in central processor $104_{1-N}$ (e.g., cached, buffered, stored in registers), a system disk (not shown) and/or in other storage space. The aforementioned programs are shown as part of system memory $112_{1-N}$ merely as an example.

In one or more embodiments, system memory $112_{1-N}$ may further include driver program(s) $220_{1-N}$ loaded therein. In an example embodiment, driver program(s) $220_{1-N}$ may be associated with a graphics card including GPUs $106_{1\ldots4}$. In one or more embodiments, system memory $112_{1-N}$ may still further include a resource manager module $222_{1-N}$ to enable interaction between driver program(s) $220_{1-N}$ and the system hardware (e.g., system memory $112_{1-N}$). In one or more embodiments, resource manager module $222_{1-N}$ may aid in processing requests from OS $216_{1-N}$ and/or application program(s) $218_{1-N}$. In an example embodiment, resource manager module $222_{1-N}$ may aid in allocation/de-allocation of system memory $112_{1-N}$ for driver program(s) $220_{1-N}$ (e.g., during loading thereof) and/or GPUs $106_{1\ldots4}$. In one or more embodiments, differing implementation(s) of resource manager module $222_{1-N}$ may enable adaptation of the same driver code to different hardware configuration(s) (e.g., different OSs). Thus, in one or more embodiments, the functionality associated with resource manager module $222_{1-N}$ may also be implemented through driver program(s) $220_{1-N}$.

In one or more embodiments, resource manager module $222_{1-N}$ may be a set of instructions configured to be executable on central processor $104_{1-N}$ and/or GPUs $106_{1\ldots4}$. Again, it is obvious that instructions associated with driver program(s) $220_{1-N}$ and/or resource manager module $222_{1-N}$ may be available in central processor $104_{1-N}$ (e.g., cached, buffered, stored in registers), a system disk (not shown) and/or in other storage space, and that the aforementioned programs are shown as part of system memory $112_{1-N}$ merely as an example.

In one or more embodiments, resource manager module $222_{1-N}$ may also include instructions associated with mapping load(s) to resources (e.g., central processor $104_{1-N}$, GPUs $106_{1\ldots4}$, system memory $112_{1-N}$, memory $114_{1\ldots4}$). In one or more embodiments, resource manager module $222_{1-N}$ may perform functions such as allocating non-GPU workloads (e.g., associated with GPU intensive algorithms) to central processor $104_{1-N}$ when central processor $104_{1-N}$ is under-utilized, mapping threads (e.g., Message Passing Interface (MPI) threads) based on the number of GPUs and/or balancing loads across GPUs depending on requirements to maximize bandwidth.

Now, in one or more embodiments, whenever one or more GPUs $106_{1 \ldots 4}$ is in an "idle" state (see discussion above), the one or more GPUs $106_{1 \ldots 4}$ may be switched to a state of "quiescent" power utilization (or, a "sleep" mode), following which power to the one or more GPUs $106_{1 \ldots 4}$ is cut off. The aforementioned process may reduce power utilization by an amount associated with the "idle" state. In one or more embodiments, upon a compute-intensive task requiring associated processing through the one or more GPUs $106_{1 \ldots 4}$ in the state of minimal (or, zero power) utilization being launched, the one or more GPUs $106_{1 \ldots 4}$ may immediately switch to the required power state seamlessly (after being powered on first) without affecting the overall cluster computing system 100/node $102_{1-N}$ and without requiring the intervention of a user of cluster computing system 100. In the enterprise customer scenario discussed above, the aforementioned switching of the one or more GPUs $106_{1 \ldots 4}$ to the state of zero power utilization during a non-requirement thereof may result in cost saving(s) to the enterprise customer.

Figure 3:
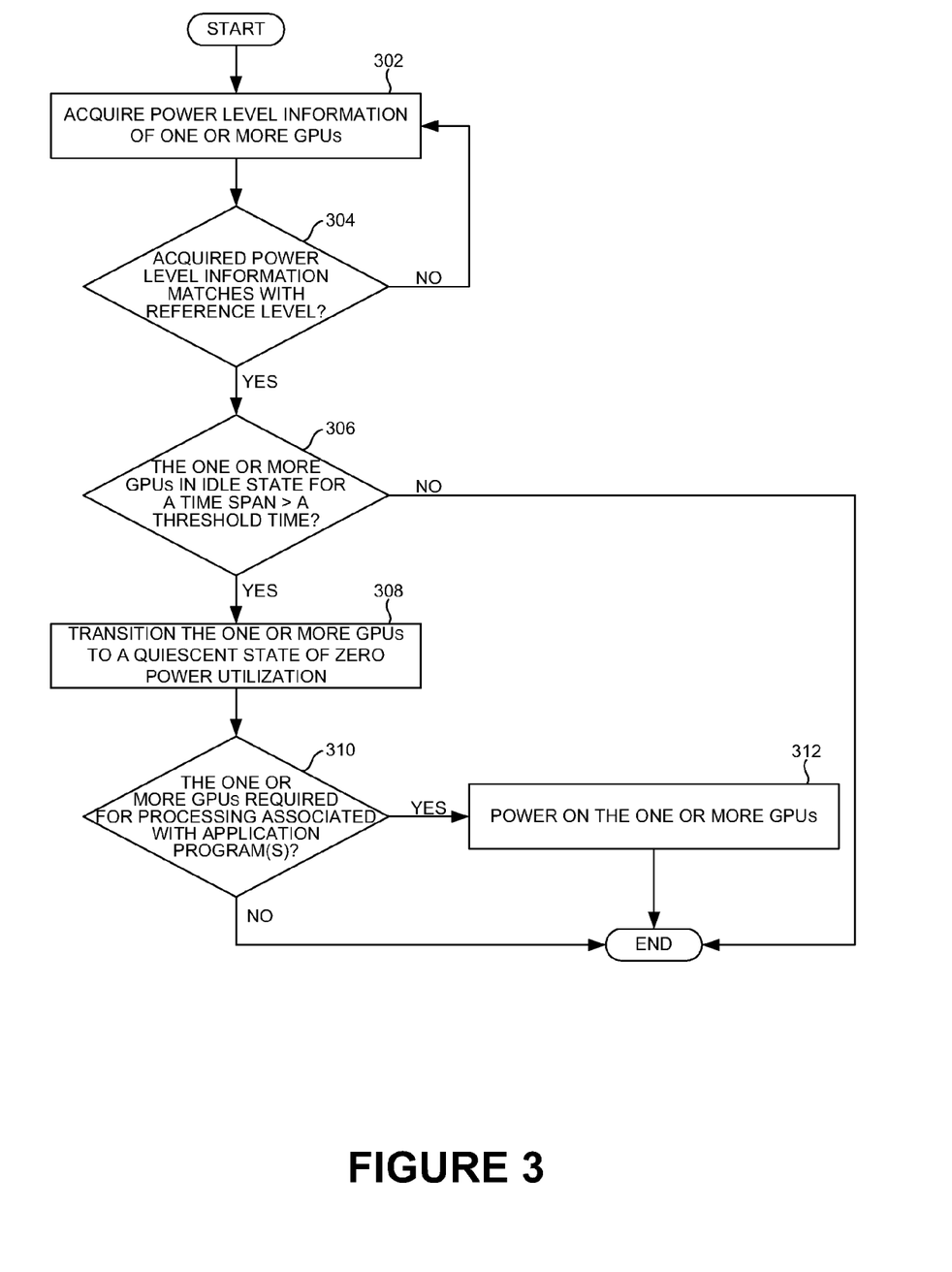
FIG. 3 is a flowchart detailing the operations involved in switching power states of one or more of GPUs of FIG. 1, according to one or more embodiments.

In order to implement the abovementioned switching, one or more possibilities may exist. All of the aforementioned possibilities are within the scope of the exemplary embodiments. FIG. 3 details one such implementation involving power levels. Specifically, FIG. 3 shows a flowchart detailing the operations involved in switching power states of one or more of GPUs $106_{1 \ldots 4}$, according to one or more embodiments. In one or more embodiments, operation 302 may involve acquiring, through resource manager module $222_{1-N}$, power level information of the one or more GPUs $106_{1 \ldots 4}$. For example, resource manager module $222_{1-N}$ may implement OS-specific functionality to be utilized by driver program(s) $220_{1-N}$ in order to process request(s) from OS $216_{1-N}$ and/or application program(s) $218_{1-N}$. Thus, resource manager module $222_{1-N}$, in conjunction with driver program(s) $220_{1-N}$, may acquire information associated with the one or more GPUs $106_{1 \ldots 4}$ through, for example, an OS $216_{1-N}$ system call. The aforementioned power level information may be in the form of a numerical value of a variable that changes with the change in state(s) of the one or more GPUs $106_{1 \ldots 4}$. Other forms of obtaining power state information are within the scope of the exemplary embodiments.

In the abovementioned example of obtaining power level information, the one or more GPUs $106_{1 \ldots 4}$ may consume less power during the "idle" state thereof, and, therefore, provide for a lower power level than an active state. A numerical value associated with the low power level at the "idle" state may, thus, be acquired through resource manager module $222_{1-N}$. In one or more embodiments, resource manager module $222_{1-N}$ may have "placed" the one or more GPUs $106_{1 \ldots 4}$ not being utilized in the "idle" state.

In one or more embodiments, operation 304 may include checking as to whether the acquired power level information matches with a reference power level (or, alternately, falls below the reference power level; for example, the reference power level may be stored in system memory $112_{1-N}$) associated with the "idle" state of the one or more GPUs $106_{1 \ldots 4}$. In one or more embodiments, if yes, operation 306 may include checking as to whether the one or more GPUs $106_{1 \ldots 4}$ is in the "idle" state for a time span exceeding a threshold time. In one or more embodiments, if yes, operation 308 may involve transitioning, through resource manager module $222_{1-N}$, the one or more GPUs $106_{1 \ldots 4}$ to a "quiescent" mode of minimal (or, zero) power utilization. For example, the "quiescent" mode may be a "sleep" mode where memory (e.g., memory $114_{1 \ldots 4}$) required to restore the state (e.g., "active" state) of the one or more GPUs $106_{1 \ldots 4}$ alone is maintained to be active and power to the GPU circuitry is cut-off. For example, resource manager module $222_{1-N}$ (in conjunction with driver program(s) $220_{1-N}$) may cut-off power to the one or more GPUs $106_{1 \ldots 4}$ through an OS $216_{1-N}$ system call. Other implementations of the "quiescent" or "sleep" mode are within the scope of the exemplary embodiments.

In one or more embodiments, whenever one or more application program(s) $218_{1-N}$ require processing through a corresponding one or more GPUs $106_{1 \ldots 4}$ in the "quiescent" state, transitioning of the one or more GPUs $106_{1 \ldots 4}$ to an active state is aided by at least the memory (e.g., memory $114_{1 \ldots 4}$) being active. In one or more embodiments, operation 310 may involve determining, through resource manager module $222_{1-N}$, as to whether the one or more GPUs $106_{1 \ldots 4}$ in the minimal (or, zero) power utilization state is required for processing associated with application program(s) $218_{1-N}$. In one or more embodiments, if yes, operation 312 may involve powering on the one or more GPUs $106_{1 \ldots 4}$ again through the assistance of resource manager module $222_{1-N}$ (e.g., which, again, in conjunction with driver program(s) $220_{1-N}$, utilizes an OS $216_{1-N}$ system call to accomplish the powering on of the one or more GPUs $106_{1 \ldots 4}$). In one or more embodiments, if no, obviously the one or more GPUs $106_{1 \ldots 4}$ may continue to be in the zero power utilization state.

As discussed above, it is obvious that other information associated with the state(s) of the one or more GPUs $106_{1 \ldots 4}$ may be utilized to enable power savings through switching off the "idle" one or more GPUs 1061 . . . 4. For example, GPU instruction cycles may be utilized to determine whether the one or more GPUs $106_{1 \ldots 4}$ is in an "idle" state or an active state. Also, implementation variations such as dispensing with the checking as to whether the one or more GPUs $106_{1 \ldots 4}$ is in the "idle" state for a time exceeding a threshold are within the scope of the exemplary embodiments.

In one or more embodiments, the abovementioned processes involved in switching off power to the "idle" one or more GPUs $106_{1 \ldots 4}$ of nodes $102_{1-N}$ may be performed during a window of time in which nodes $102_{1-N}$ are predictably underutilized on a periodic and reoccurring basis. As discussed above, the window of time may be outside working hours of an organization (e.g., a bank). In one or more embodiments, the window of time of predictable underutilization of node $102_{1-N}$ may also be calculated through resource manager module $222_{1-N}$. Other means of calculating the window of time are within the scope of the exemplary embodiments discussed herein. In one or more embodiments, resource manager module $222_{1-N}$ may be configured to analyze utilization data associated with node $102_{1-N}$ over a period of time, following which a predicted utilization rate of node $102_{1-N}$ during the window of time is determined.

Now, in one or more embodiments, whenever a utilization rate (e.g., calculated through resource manager module $222_{1-N}$ of node $102_{1-N}$ exceeds the predicted utilization rate during the window of time, the switched off one or more GPUs $106_{1 \ldots 4}$ may be powered on again, as discussed above, depending on the processing requirement. In one or more embodiments, the predicted utilization rate may be stored in one or more memories (e.g., system memory $112_{1-N}$, memory $114_{1 \ldots 4}$) associated with node $102_{1-N}$.

Thus, as discussed above, in one or more embodiments, the switching off of the "unwanted" one or more GPUs $106_{1 \ldots 4}$ in nodes $102_{1-N}$ of cluster computing system 100 may result in huge power savings. Even in the example 45 W power consumption associated with a GPU in the "idle" state for one hour, the power consumption further depends on temperature and fan control speed. The "zero" power consumption may result in "zero" heat emission, thereby reducing costs associated with cooling systems. In one or more embodiments, the cost savings may also be supplemented with prolonged lifetime of the one or more GPUs $106_{1...4}$.

In an example scenario where an application that normally utilizes processing/computing power of four GPUs has a computing requirement thereof reduced to two GPUs (e.g., by releasing two GPUs), the two GPUs in the "idle" state may be transitioned to the "quiescent" state of minimal (or, zero) power utilization. Therefore, exemplary embodiments provide for smart power management of multiple GPUs in cluster computing system 100 through the maintenance of one or more "idle" GPUs (e.g., GPUs $106_{1...4}$) in a state of zero power utilization. Also, exemplary embodiments provide the ability to simultaneously switch multiple GPUs in cluster computing system 100 from the state of zero power utilization to an active (or, high power) state, depending on processing requirements. The aforementioned capability of simultaneous switching of states of multiple GPUs $106_{1...4}$ in node $102_{1-N}$ may be realized in accordance with changes in utilization rate of node $102_{1-N}$ when compared to the predicted utilization rate thereof during the window of time of predictable underutilization of node $102_{1-N}$ discussed above.

In order to accomplish the abovementioned transitioning of the states of the one or more GPUs $106_{1...4}$ of nodes $102_{1-N}$ of cluster computing system, in one or more embodiments, resource manager module $222_{1-N}$ may be suitably modified. In one or more embodiments, as discussed above, resource manager module $222_{1-N}$ may be part of a driver program $220_{1-N}$. Thus, alternately, in one or more embodiments, driver program $220_{1-N}$ may be suitably modified. As driver program(s) $220_{1-N}$ are OS-specific, in one or more embodiments, implementations thereof may vary with OSs $216_{1-N}$. In one or more embodiments, driver program(s) $220_{1-N}$ may be packaged with appropriate libraries to aid portability with multiple OSs $216_{1-N}$. In one or more embodiments, the appropriate driver program(s) $220_{1-N}$ or instantiation(s) thereof may be installed on one or more nodes $102_{1-N}$ of cluster computing system 100. Alternately, in one or more embodiments, instructions associated with providing the ability to switch between states of the one or more GPUs $106_{1...4}$ may be provided as an "add-on" patch that may be downloaded from a website to a machine-readable medium (e.g., hard disk) and/or transferred/installed from a machine-readable medium (e.g., Compact Disc (CD), Digital Video Disc (DVD), floppy disk).

Figure 4:
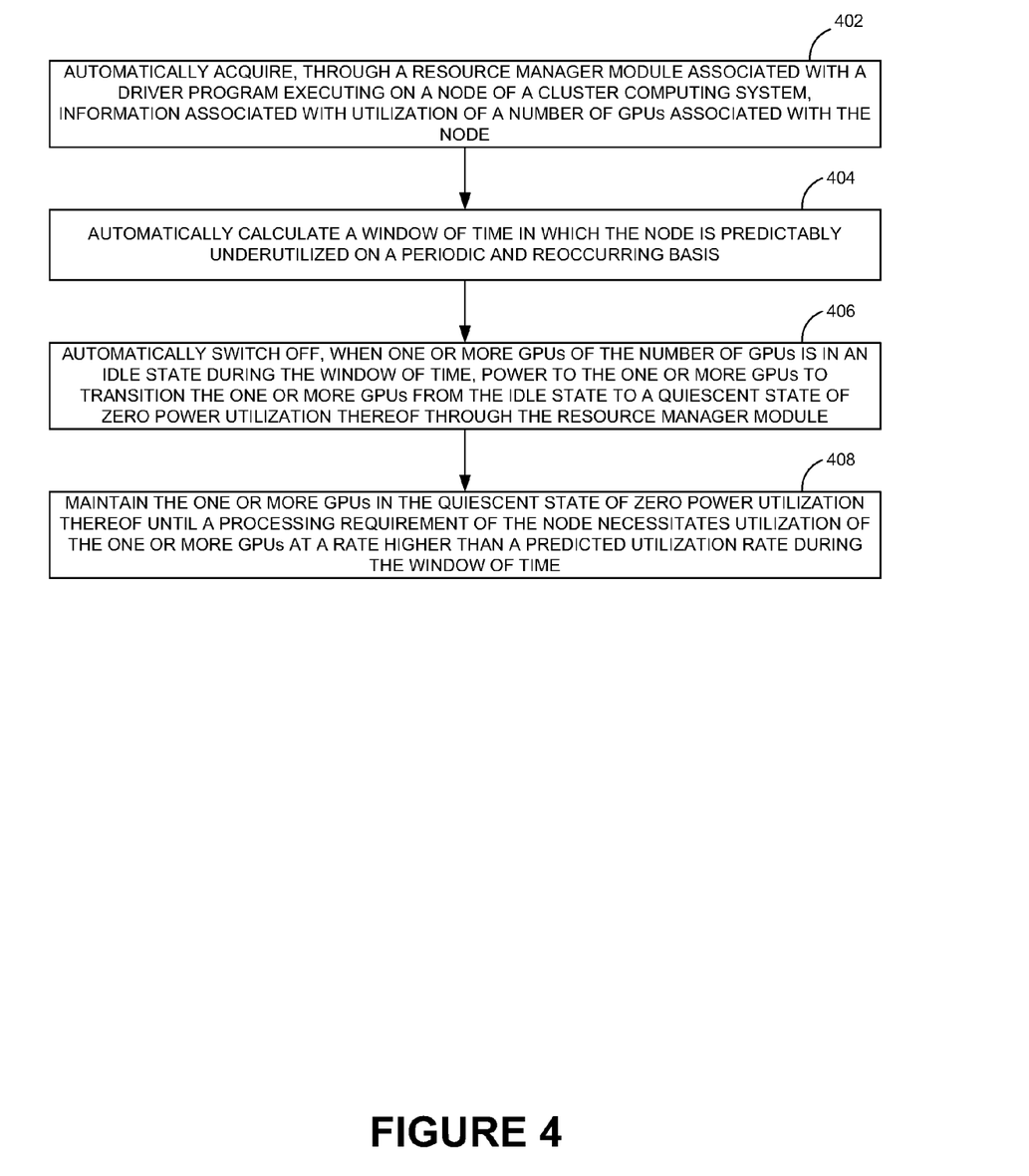
FIG. 4 is a process flow diagram detailing the operations involved in a method of realizing power savings associated with one or more GPUs of a node of the cluster computing system of FIG. 1, according to one or more embodiments.

FIG. 4 shows a process flow diagram detailing the operations involved in a method of realizing power savings associated with one or more GPUs $106_{1...4}$ of node $102_{1-N}$ of cluster computing system 100, according to one or more embodiments. In one or more embodiments, operation 402 may involve automatically acquiring, through resource manager module $222_{1-N}$ associated with driver program $220_{1-N}$ executing on node $102_{1-N}$ of cluster computing system 100, information associated with utilization of a number of GPUs $106_{1...4}$ associated with node $102_{1-N}$. In one or more embodiments, the number of GPUs $106_{1...4}$ may be configured to perform substantial processing associated with node $102_{1-N}$. In one or more embodiments, operation 404 may involve automatically calculating a window of time in which node $102_{1-N}$ is predictably underutilized on a reoccurring and periodic basis.

In one or more embodiments, operation 406 may involve automatically switching off, when the one or more GPUs $106_{1...4}$ of the number of GPUs $106_{1...4}$ is in an idle state during the window of time in which node $102_{1-N}$ is predictably underutilized on the reoccurring and periodic basis, power to the one or more GPUs $106_{1...4}$ to transition the one or more GPUs $106_{1...4}$ from the idle state to a quiescent state of zero power utilization thereof through resource manager module $222_{1-N}$ associated with driver program $220_{1-N}$. In one or more embodiments, operation 408 may then involve maintaining the one or more GPUs $106_{1...4}$ in the quiescent state of zero power utilization thereof until a processing requirement of node $102_{1-N}$ necessitates utilization of the one or more GPUs $106_{1...4}$ at a rate higher than a predicted utilization rate of node $102_{1-N}$ during the window of time.

Figure 5:
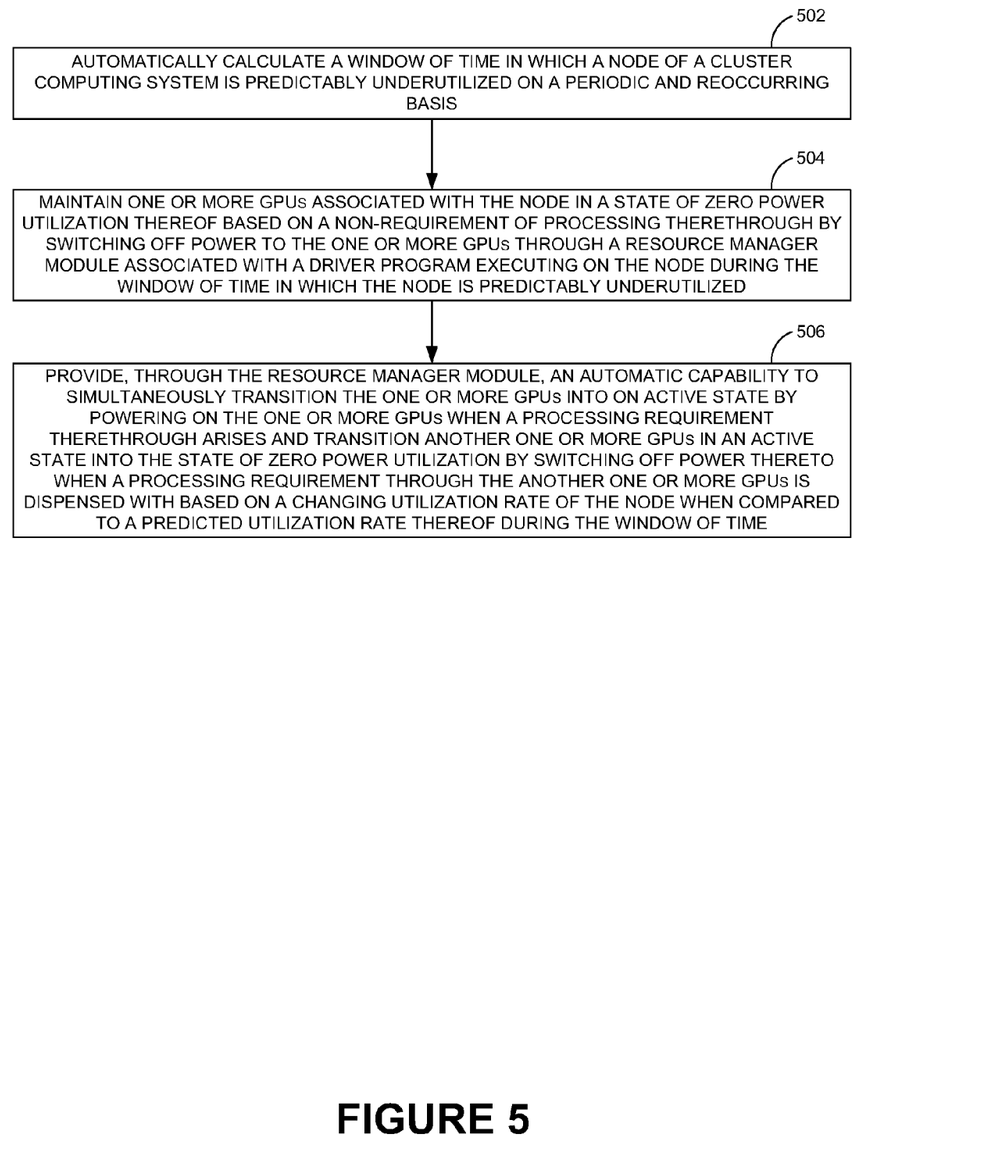
FIG. 5 is a process flow diagram detailing the operations involved in a method of simultaneously managing power states of multiple GPUs of a node of the cluster computing system of FIG. 1, according to one or more embodiments.

FIG. 5 shows a process flow diagram detailing the operations involved in a method of simultaneously managing power states of multiple GPUs $106_{1...4}$ of node $102_{1-N}$ of cluster computing system 100, according to one or more embodiments. In one or more embodiments, operation 502 may involve automatically calculating a window of time in which node $102_{1-N}$ is predictably underutilized on a reoccurring and periodic basis. In one or more embodiments, node $102_{1-N}$ may include a number of GPUs $106_{1...4}$ configured to perform substantially processing associated therewith. In one or more embodiments, operation 504 may involve maintaining one or more GPUs $106_{1...4}$ associated with node $102_{1-N}$ of cluster computing system 100 in a state of zero power utilization thereof based on a non-requirement of processing therethrough by switching off power to the one or more GPUs $106_{1...4}$ through resource manager module $222_{1-N}$ associated with driver program $220_{1-N}$ executing on the node $102_{1-N}$ during the window of time in which node $102_{1-N}$ is predictably underutilized.

In one or more embodiments, operation 506 may then involve providing, through resource manager module $222_{1-N}$, an automatic capability to simultaneously transition the one or more GPUs $106_{1...4}$ into an active state by powering on the one or more GPUs $106_{1...4}$ when a processing requirement therethrough arises and transition another one or more GPUs $106_{1...4}$ in an active state into the state of zero power utilization by switching off power thereto when a processing requirement through the another one or more GPUs $106_{1...4}$ is dispensed with based on a changing utilization rate of node $102_{1-N}$ when compared to a predicted utilization rate thereof during the window of time.

It is obvious that the acquiring of information associated with the utilization of the one or more GPUs $106_{1...4}$ and the switching of states through resource manager module $222_{1-N}$ based on processing requirement(s) (or, alternately, smart power management) discussed above may be performed continuously or periodically.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer device). Accordingly, the specification and drawings are to be regarded in an illustrative rather than a restrictive sense.

What is claimed is:

1. A method comprising:
automatically acquiring, through a resource manager module associated with a driver program executing on a node of a cluster computing system, information associated with utilization of a plurality of GPUs associated with the node, the plurality of GPUs being configured to perform substantial processing associated with the node;
automatically calculating a window of time in which the node is predictably underutilized on a reoccurring and periodic basis;
automatically switching off, when at least one GPU of the plurality of GPUs is in an idle state during the window of time in which the node is predictably underutilized on the reoccurring and periodic basis, power to the at least one GPU to transition the at least one GPU from the idle state to a quiescent state of zero power utilization thereof through the resource manager module associated with the driver program; and
maintaining the at least one GPU in the quiescent state of zero power utilization thereof until a processing requirement of the node necessitates utilization of the at least one GPU at a rate higher than a predicted utilization rate of the node during the window of time.

2. The method of claim 1, further comprising powering on the at least one GPU in the quiescent state of zero power utilization to transition the at least one GPU to an active state in accordance with the processing requirement through the resource manager module associated with the driver program.

3. The method of claim 1, wherein the information associated with the utilization of the plurality of GPUs is a power information.

4. The method of claim 2, comprising accomplishing at least one of the acquiring of the information associated with the utilization of the plurality of GPUs, the switching off of power to the at least one GPU in the idle state and the powering on of the at least one GPU in the quiescent state through a system call to an operating system associated with the node.

5. The method of claim 2, wherein maintaining the at least one GPU in the quiescent state includes maintaining, in an active state, a memory required to restore the at least one GPU to the active state thereof.

6. The method of claim 1, further comprising checking as to whether the at least one GPU is in the idle state for a time span exceeding a threshold time prior to switching off power thereto.

7. A method comprising:
automatically calculating a window of time in which a node of a cluster computing system is predictably underutilized on a reoccurring and periodic basis, the node including a plurality of GPUs configured to perform a substantial portion of processing associated therewith;
maintaining at least one GPU associated with the node of the cluster computing system in a state of zero power utilization thereof based on a non-requirement of processing therethrough by switching off power to the at least one GPU through a resource manager module associated with a driver program executing on the node during the window of time in which the node is predictably underutilized; and
providing, through the resource manager module, an automatic capability to simultaneously transition the at least one GPU into an active state by powering on the at least one GPU when a processing requirement therethrough arises and transition another at least one GPU in an active state into the state of zero power utilization by switching off power thereto when a processing requirement through the another at least one GPU is dispensed with based on a changing utilization rate of the node when compared to a predicted utilization rate thereof during the window of time.

8. The method of claim 7, further comprising:
acquiring, through the resource manager module associated with the driver program, information associated with utilization of the at least one GPU and the another at least one GPU; and
transitioning the state of at least one of the at least one GPU and the another at least one GPU based on the information acquired.

9. The method of claim 8, wherein the information associated with at least one of the utilization of the at least one GPU and the utilization of the another at least one GPU is a power information.

10. The method of claim 8, comprising accomplishing at least one of the acquiring of the information associated with the utilization of the at least one GPU and the another at least one GPU, the switching off of power to the at least one GPU and the another at least one GPU and the powering on of the at least one GPU through a system call to an operating system associated with the node.

11. The method of claim 7, wherein maintaining the at least one GPU in the state of zero power utilization thereof includes maintaining, in an active state, a memory required to restore the at least one GPU to the active state thereof.

12. The method of claim 7, further comprising checking as to whether the at least one GPU is in an idle state for a time span exceeding a threshold time prior to switching off power thereto.

13. A cluster computing system comprising:
a plurality of nodes, each node comprising:
a central processor;
a system memory having an operating system and a driver program associated therewith, the driver program having a resource manager module associated therewith configured to execute on the central processor; and
a plurality of GPUs configured to perform a substantial portion of processing associated with the each node, the resource manager module being configured to:
acquire information associated with utilization of the plurality of GPUs,
switch off, when at least one GPU of the plurality of GPUs is in an idle state, power to the at least one GPU to transition the at least one GPU from the idle state to a quiescent state of zero power utilization thereof during a window of time in which the each node is predictably underutilized on a periodic and reoccurring basis, and
maintain the at least one GPU in the quiescent state of zero power utilization thereof until a processing requirement of the node necessitates utilization of the at least one GPU at a rate higher than a predicted utilization rate of the each node during the window of time.

14. The cluster computing system of claim 13, wherein the resource manager module is further configured to power on the at least one GPU in the quiescent state of zero power utilization to transition the at least one GPU to an active state in accordance with the processing requirement.

15. The cluster computing system of claim 13, wherein the information associated with the utilization of the plurality of GPUs is a power information.

16. The cluster computing system of claim 14, wherein at least one of the acquiring of the information associated with the utilization of the plurality of GPUs, the switching off of power to the at least one GPU in the idle state and the powering on of the at least one GPU in the quiescent state is accomplished through a system call to the operating system.

17. The cluster computing system of claim 14, further comprising a memory maintained in an active state for the resource manager module to restore the at least one GPU maintained in the quiescent state to the active state thereof.

18. The cluster computing system of claim 13, wherein the resource manager module is configured to initiate a check as to whether the at least one GPU is in the idle state for a time span exceeding a threshold time prior to switching off power thereto.

19. The cluster computing system of claim 13, further comprising an application program residing on the system memory, an execution of which determines the processing requirement of the node.

20. The cluster computing system of claim 13, wherein the resource manager module is implemented as a part of the driver program.

* * * * *